(12) United States Patent
Tachibana et al.

(10) Patent No.: US 9,938,923 B2
(45) Date of Patent: Apr. 10, 2018

(54) CONTROL SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Rintarou Tachibana, Toyota (JP); Tooru Suda, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/408,928

(22) Filed: Jan. 18, 2017

(65) Prior Publication Data

US 2017/0211501 A1    Jul. 27, 2017

(30) Foreign Application Priority Data

Jan. 27, 2016 (JP) ................. 2016-013822

(51) Int. Cl.
 *F02B 1/00*  (2006.01)
 *F02D 41/30* (2006.01)
 (Continued)

(52) U.S. Cl.
 CPC ....... *F02D 41/3094* (2013.01); *F02D 35/028* (2013.01); *F02D 41/34* (2013.01);
 (Continued)

(58) Field of Classification Search
 CPC ............ F02D 41/3094; F02D 19/081; F02D 41/0025; F02D 41/062; F02D 41/064; F02D 2041/2055; F02D 41/30; F02M 69/00
 (Continued)

(56) References Cited

U.S. PATENT DOCUMENTS 6,810,855 B2    11/2004  Hasegawa et al.
2008/0281500 A1*  11/2008  Nakata ................ F02D 41/3809
                                                701/103
(Continued)

FOREIGN PATENT DOCUMENTS

JP    H07-208236 A    8/1995
JP    2012-237274 A   12/2012
JP    2014-190186 A   10/2014

OTHER PUBLICATIONS

International Patent Application No. PCT/JP2016/080726 filed on Oct. 17, 2016.

(Continued)

*Primary Examiner* — John Kwon
(74) *Attorney, Agent, or Firm* — Oliff PLC

(57) ABSTRACT

A control system of an internal combustion engine includes a port injection valve and an electronic control unit. The electronic control unit is configured to: (i) obtain one of a start crank angle and an end crank angle, (ii) calculate the other of the start crank angle and the end crank angle, based on an equation for calculating a provisional injection amount of the case where the port injection valve provisionally injects the fuel with the one of the start crank angle and the end crank angle and a given crank angle range; (iii) convert a crank angle range from the start crank angle to the end crank angle, into a target energization period; and (iv) perform fuel injection by energizing the port injection valve for the target energization period.

6 Claims, 7 Drawing Sheets

(51) Int. Cl.
   *F02D 35/02* (2006.01)
   *F02M 55/02* (2006.01)
   *F02D 41/34* (2006.01)
   *F02D 41/38* (2006.01)

(52) U.S. Cl.
   CPC ..... *F02M 55/02* (2013.01); *F02D 2041/3881* (2013.01); *F02D 2200/0602* (2013.01); *F02D 2200/0604* (2013.01); *F02D 2250/04* (2013.01); *Y02T 10/44* (2013.01)

(58) Field of Classification Search
   USPC ........ 123/429–432, 434, 673, 685, 478, 480
   See application file for complete search history.

(56) References Cited

U.S. PATENT DOCUMENTS

| 2009/0326788 A1* | 12/2009 | Yuasa ................. | F02D 41/3809 |
| | | | 701/104 |
| 2017/0211502 A1* | 7/2017 | Tachibana ............... | F02D 41/32 |
| 2017/0211503 A1* | 7/2017 | Tachibana ............... | F02D 41/34 |

OTHER PUBLICATIONS

U.S. Appl. No. 15/409,390, filed Jan. 18, 2017.
U.S. Appl. No. 15/409,365, filed Jan. 18, 2017.

\* cited by examiner

CONTROL SYSTEM OF INTERNAL COMBUSTION ENGINE

INCORPORATION BY REFERENCE

The disclosure of Japanese Patent Application No. 2016-013822 filed on Jan. 27, 2016 including the specification, drawings and abstract is incorporated herein by reference in its entirety.

BACKGROUND

1. Technical Field

The present disclosure relates to a control system of an internal combustion engine.

2. Description of Related Art

An internal combustion engine including direct injection valves and port injection valves is known. In the internal combustion engine, fuel pumped up by a low-pressure pump is supplied to the port injection valves via a low-pressure fuel passage, and the fuel further pressurized by a high-pressure pump is supplied to the direct injection valves via a high-pressure fuel passage. In this arrangement, the fuel injection amount of each port injection valve is controlled, based on a detection value of a fuel pressure sensor that detects the pressure of the fuel supplied to the port injection valve.

In Japanese Patent Application Publication No. 7-208236 (JP 7-208236 A), it is disclosed that the fuel injection amount of the port injection valve is corrected, based on a difference between the above-mentioned fuel pressure and the pressure in an intake passage, so that the fuel injection amount is controlled with further improved accuracy.

SUMMARY

In the above-described arrangement, the fuel pressure may pulsate in the low-pressure fuel passage, mainly because of driving of the high-pressure pump. Since the fuel pressure varies in a short period while the pulsation is being generated, the actual fuel pressure may change during a period from the time when a detection value of the fuel pressure sensor is obtained to the time when fuel injection is carried out, and the actual fuel pressure may also change during injection. According to the technology of JP 7-208236 A, the fuel injection amount is corrected, without taking account of the pulsation; therefore, the fuel injection amount of the port injection valve may not be controlled with high accuracy in the case where pulsation occurs.

The present disclosure provides a control system of an internal combustion engine, which is able to control the fuel injection amount of a port injection valve with high accuracy, even when fuel pressure pulsation occurs in a low-pressure fuel passage due to a high-pressure pump.

A control system of an internal combustion engine according to one aspect of the present disclosure includes a direct injection valve, a port injection valve, a low-pressure pump, a low-pressure fuel supply passage, a high-pressure pump, a high-pressure fuel supply passage, a crank angle sensor, and an electronic control unit. The direct injection valve is configured to directly inject a fuel into a cylinder of the internal combustion engine. The port injection valve is configured to inject the fuel into an intake port of the internal combustion engine. The low-pressure pump is configured to pressurize the fuel. The fuel pressurized by the low-pressure pump is supplied to the port injection valve through the low-pressure fuel supply passage. The high-pressure pump is operatively linked with the internal combustion engine and configured to be driven by the internal combustion engine. The high-pressure pump is configured to further pressurize the fuel supplied from the low-pressure fuel supply passage, such that pulsation of a fuel pressure is generated in the low-pressure fuel supply passage. The fuel pressurized by the high-pressure pump is supplied to the direct injection valve through the high-pressure fuel supply passage. The crank angle sensor is configured to detect a crank angle of the internal combustion engine. The electronic control unit is configured to calculate a required injection amount of the fuel required to be injected from the port injection valve, based on conditions of the internal combustion engine. The electronic control unit is configured to obtain one of a start crank angle and an end crank angle. The start crank angle is a crank angle corresponding to a scheduled start time of fuel injection of the port injection valve. The end crank angle is a crank angle corresponding to a scheduled end time of fuel injection of the port injection valve. The electronic control unit is configured to calculate the other of the start crank angle and the end crank angle, based on an equation (2) of $Q_p$ below for calculating a provisional injection amount of the case where the port injection valve provisionally injects the fuel with the one of the start crank angle and the end crank angle and a given crank angle range, such that a value obtained by subtracting a provisional injection amount from a base crank angle corresponding to an initial phase of the pulsation to the start crank angle, from a provisional injection amount from the base crank angle to the end crank angle becomes equal to the required injection amount.

$$Q_p = \frac{k}{360 \cdot Ne} \int \sqrt{P(\theta)} d\theta \qquad (2)$$

where, $Q_p$ is the provisional injection amount, k is a constant, and Ne is a rotational speed of the internal combustion engine, P is a fuel pressure value corresponding to the crank angle, $\theta$ is the crank angle. P is calculated by equation (1) below.

$$P(\theta) = A \cos\{c(\theta - B)\} + P_c \qquad (1)$$

where, A is an amplitude of the pulsation, c is the number of times of discharge of the fuel from the high-pressure pump per 360 degrees of the crank angle, B is the initial phase of the pulsation, $P_c$ is a center fuel pressure value of the pulsation. The electronic control unit is configured to convert a crank angle range from the start crank angle to the end crank angle, into a target energization period. The electronic control unit is configured to perform fuel injection by energizing the port injection valve for the target energization period.

In the control system of the internal combustion engine according to the above aspect of the present disclosure, the other of the start crank angle and the end crank angle is calculated with high accuracy since it is calculated based on Eq. (2) including Eq. (1) that models pulsation. Thus, the target energization period can be calculated with high accuracy, and the fuel injection amount can be controlled with high accuracy, even when pulsation occurs.

For calculation of the other of the start crank angle and the end crank angle, the provisional injection amount from the base crank angle to the end crank angle, and the provisional injection amount from the base crank angle to the start crank angle are used, instead of the provisional injection amount from the start crank angle to the end crank angle. In this connection, since the base crank angle is a crank angle corresponding to the initial phase, the fuel pressure value at the base crank angle can be simply expressed by Eq. (1). Accordingly, the above-indicated two provisional amounts can be simply expressed. Thus, the processing load of the electronic control unit for calculating the other of the start crank angle and the end crank angle is less likely or unlikely to be increased.

The control system of the internal combustion engine according to the above aspect of the present disclosure may further include a fuel pressure sensor configured to detect the fuel pressure in the low-pressure fuel supply passage. The electronic control unit may be configured to obtain a detection value of the fuel pressure sensor at fixed sampling time intervals. The electronic control unit may be configured to determine whether the start crank angle is between a first crank angle at a point in time at which the detection value of the fuel pressure sensor as a latest fuel pressure value is obtained, and a second crank angle at a point in time at which the detection value is scheduled to be obtained next time. The electronic control unit may be configured to calculate the other of the start crank angle and the end crank angle, when the electronic control unit determines that the start crank angle is between the first crank angle and the second crank angle.

The control system of the internal combustion engine according to the above aspect of the present disclosure may further include a fuel pressure sensor configured to detect the fuel pressure in the low-pressure fuel supply passage. The electronic control unit may include a memory that stores the number of times of discharge of the fuel from the high-pressure pump per 360 degrees of the crank angle. The electronic control unit may be configured to obtain a detection value of the fuel pressure sensor at fixed sampling time intervals. The electronic control unit may be configured to calculate a center fuel pressure value of the pulsation, an amplitude of the pulsation, and an initial phase of the pulsation, based on at least a first latest fuel pressure value, a second latest fuel pressure value, and a third latest fuel pressure value as detection values of the fuel pressure sensor. The first latest fuel pressure value is obtained most recently, and the second latest fuel pressure value is obtained immediately before the first latest fuel pressure value is obtained, while the third latest fuel pressure value is obtained immediately before the second latest fuel pressure value.

In the control system of the internal combustion engine as described above, the electronic control unit may be configured to calculate the amplitude of the pulsation, based on the second latest fuel pressure value and the first latest fuel pressure value as the detection values of the fuel pressure sensor, and the crank angle corresponding to the sampling time interval.

In the control system of the internal combustion engine as described above, the electronic control unit may be configured to calculate the initial phase of the pulsation, based on one of the second latest fuel pressure value and the first latest fuel pressure value as the detection values of the fuel pressure sensor, the crank angle at a time when the one of the second latest fuel pressure value and the first latest fuel pressure value is obtained, the number of times of discharge from the high-pressure pump per 360 degrees of the crank angle, the calculated amplitude of the pulsation, and the calculated center fuel pressure value of the pulsation.

In the control system of the internal combustion engine according to the above aspect of the present disclosure, the electronic control unit may be configured to determine whether a rotational speed of the internal combustion engine belongs to a pulsation increase region in which the pulsation increases as compared with other rotational speed regions of the internal combustion engine. The electronic control unit may be configured to calculate the other of the start crank angle and the end crank angle, when the rotational speed of the internal combustion engine belongs to the pulsation increase region.

According to the present disclosure, it is possible to provide the control system of the internal combustion engine, which can control the fuel injection amount of the port injection valve, even when fuel pressure pulsation occurs in the low-pressure fuel passage due to the high-pressure pump.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A preferred embodiment of the present disclosure will be described with reference to the drawings.

Figure 1:
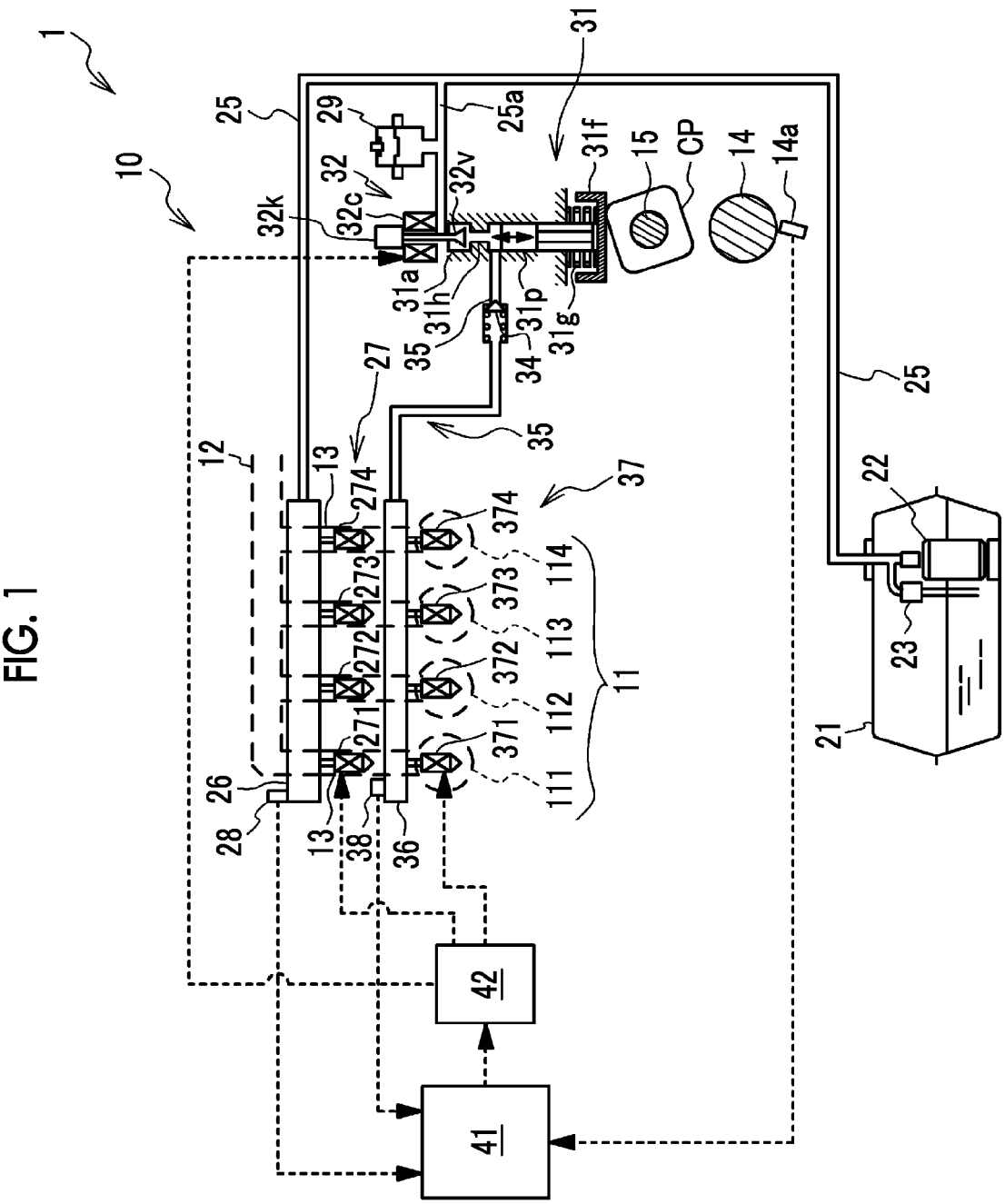
FIG. 1 is a schematic view showing the configuration of a control system as one embodiment of the present disclosure.

FIG. 1 schematically shows the configuration of a control system 1 of this embodiment. The control system 1 includes an engine 10, and an ECU (Electronic Control Unit) 41 that controls the engine 10. The engine 10 is a spark-ignition type in-line four-cylinder engine having a group of cylinders 11 including cylinders 111-114 that are arranged in series, a group of direct injection valves 37, and a group of port injection valves 27. The engine 10 is one example of the internal combustion engine, and the control system 1 is one example of the control system of the internal combustion engine.

The group of direct injection valves 37 includes direct injection valves 371-374 that inject fuel into the cylinders 111-114, respectively. The group of port injection valves 27 includes port injection valves 271-274 that inject fuel into intake ports 13 that communicate with the cylinders 111-114, respectively. Each of the direct injection valves 371-

374 and the port injection valves 271-274 is an electromagnetically driven shutoff valve or solenoid valve having an electromagnetic coil, a valve seat and a valve body. In operation, the electromagnetic coil is energized for a given energization period, so that the valve body is moved away from the valve seat, thereby to adjust the fuel injection amount.

The engine 10 is formed with an intake passage 12 having a plurality of intake ports 13 corresponding to the cylinders 111-114, respectively, and an exhaust passage having a plurality of exhaust ports (not shown). In each of the cylinders 111-114, a piston (not shown) is received and a combustion chamber is defined. The combustion chambers are opened and closed by intake valves and exhaust valves. The engine 10 further includes ignition plugs (not shown). Also, the engine 10 includes a crankshaft 14 that is operatively linked with a plurality of pistons, and a camshaft 15 that is operatively linked with the crankshaft 14 and drives the intake valves or the exhaust valves. Also, a crank angle sensor 14a is provided for detecting the angle of rotation of the crankshaft 14. The crank angle sensor 14a is preferably capable of detecting the crank angle with high resolution of about 1 degree, for example, but the resolution is not limited to this.

The control system 1 also includes a fuel tank 21, low-pressure pump 22, pressure regulator 23, low-pressure fuel pipe 25, low-pressure delivery pipe 26, and a fuel pressure sensor 28.

Gasoline as a fuel is stored in the fuel tank 21. The low-pressure pump 22 pressurizes the fuel and discharges it into the low-pressure fuel pipe 25. The pressure regulator 23 regulates the pressure of the fuel discharged into the low-pressure fuel pipe 25, to a preset low-pressure-side supply pressure.

The low-pressure fuel pipe 25 and the low-pressure delivery pipe 26 constitute one example of the low-pressure fuel supply passage through which the fuel discharged from the low-pressure pump 22 is supplied to the port injection valves 271-274. The fuel is drawn into the low-pressure delivery pipe 26 via the low-pressure fuel pipe 25, after its pressure is raised to a given pressure level by the low-pressure pump 22, and is regulated to the low-pressure-side supply pressure by the pressure regulator 23.

The port injection valves 271-274 are connected to the low-pressure delivery pipe 26, and inject the fuel into the intake ports 13 corresponding to the cylinders 111-114, respectively. The fuel pressure sensor 28, which will be described in detail later, detects the fuel pressure in the low-pressure delivery pipe 26. The ECU 41 obtains detection values of the fuel pressure sensor 28 at fixed sampling time intervals.

The control system 1 also includes a high-pressure pump 31, high-pressure fuel pipe 35, high-pressure delivery pipe 36, and a fuel pressure sensor 38.

The high-pressure pump 31 sucks the fuel from a branch pipe 25a that branches off from the low-pressure fuel pipe 25, and pressurizes the fuel to a high pressure level that is higher than the level of the supply pressure from the low-pressure pump 22. The branch pipe 25a is provided with a pulsation damper 29 that suppresses fuel pressure pulsation in the branch pipe 25a.

More specifically, the high-pressure pump 31 includes a pump housing 31h, a plunger 31p that can slide in the pump housing 31h, and a pressurizing chamber 31a defined between the pump housing 31h and the plunger 31p. The volume of the pressurizing chamber 31a changes according to the displacement of the plunger 31p. When a solenoid valve 32 (which will be described later) is in an open state, the fuel pressurized by the low-pressure pump 22 is drawn into the pressurizing chamber 31a, via the branch pipe 25a. The fuel in the pressurizing chamber 31a is pressurized by the plunger 31p to a high pressure level, and discharged into the high-pressure fuel pipe 35.

A cam CP that drives the plunger 31p is mounted on the camshaft 15 of the engine 10. The shape of the cam CP is generally square with rounded corners. The high-pressure pump 31 has a follower lifter 31f that is moved up and down by the cam CP, and a spring 31g that biases the follower lifter 31f toward the cam CP. The plunger 31p is operatively linked with the follower lifter 31f, and moves up and down along with the follower lifter 31f. The camshaft 15 is operatively linked with the crankshaft 14 via a chain or a belt. The camshaft 15 and the cam CP are driven at a rotational speed that is a half of the rotational speed of the crankshaft 14.

The solenoid valve 32 is provided in a fuel inlet portion of the pressurizing chamber 31a of the high-pressure pump 31. The solenoid valve 32 has a valve body 32v, a coil 32c that drives the valve body 32v, and a spring 32k that constantly biases the valve body 32v in a valve-opening direction. The energization of the coil 32c (i.e., application of current to the coil 32c) is controlled by the ECU 41 via a driver circuit 42. When the coil 32c is energized, the valve body 32v shuts off communication between the branch pipe 25a of the low-pressure fuel pipe 25 and the pressurizing chamber 31a, against the bias force of the spring 32k. When the coil 32c is in a de-energized state, the valve body 32v is kept in the open state under the bias force of the spring 32k.

A check valve 34 with a spring is provided in the high-pressure fuel pipe 35 between the high-pressure pump 31 and the group of direct injection valves 37. The check valve 34 opens when the fuel pressure in the high-pressure pump 31 becomes higher by a given amount than the fuel pressure in the high-pressure fuel pipe 35.

On the suction stroke of the high-pressure pump 31, the solenoid valve 32 is opened, and the plunger 31p moves downward, so that the pressurizing chamber 31a is filled with the fuel fed from the branch pipe 25a of the low-pressure fuel pipe 25. On the pressurizing stroke, the solenoid valve 32 is closed, and the volume of the pressurizing chamber 31a is reduced as the plunger 31p moves upward, so that the pressure of the fuel in the pressurizing chamber 31a is raised. On the discharge stroke, the check valve 34 opens when the force produced by the fuel pressure in the pressurizing chamber 31a becomes larger than the bias force of the spring of the check valve 34, and the fuel whose pressure has been raised is supplied to the high-pressure fuel pipe 35 and the high-pressure delivery pipe 36. As described above, rotation of the cam CP is utilized for moving the plunger 31p up and down, and the cam CP is operatively linked with the crankshaft 14 via the camshaft 15 so as to move along with the crankshaft 14; therefore, the high-pressure pump 31 is driven in coordination with the crankshaft 14.

While the solenoid valve 32 is placed in the open state when it is not energized, the manner of operating the solenoid valve 32 is not limited to this. For example, the biasing directions of the coil 32c and the spring 32k may be respectively reversed, and the solenoid valve 32 may be arranged to be placed in the closed state when it is not energized. In this case, the coil 32c is energized on the fuel suction stroke, and is not energized on the pressurizing and discharge strokes.

The high-pressure fuel pressurized by the high-pressure pump 31 is fed to the high-pressure delivery pipe 36 via the high-pressure fuel pipe 35, and accumulated in the delivery pipe 36. The high-pressure fuel pipe 35 and the high-pressure delivery pipe 36 constitute one example of the high-pressure fuel supply passage through which high-pressure fuel is supplied from the high-pressure pump 31 to the direct injection valves 371-374.

The direct injection valves 371-374 directly inject the high-pressure fuel from the high-pressure delivery pipe 36 into the cylinders 111-114, respectively, in a predetermined order. The fuel pressure sensor 38 detects the fuel pressure in the high-pressure delivery pipe 36, and the ECU 41 obtains detection values of the fuel pressure sensor 38, at fixed sampling time intervals.

The ECU 41 includes CPU (Central Processing Unit), ROM (Read-Only Memory), and RAM (Random Access Memory). The ECU 41 performs port injection control as will be described later, according to a control program stored in advance in the ROM, based on information from sensors, information stored in advance in the ROM, etc. This control, which will be described in detail later, is performed by a required injection amount calculating unit, obtaining unit, storage unit, calculating unit, target energization period converting unit, injection control unit, detection value obtaining unit, model calculating unit, discharge frequency storage unit, pulsation determining unit, and an injection start determining unit, which are functionally implemented by the CPU, ROM, and RAM.

The ECU 41 calculates the required injection amount of the fuel required to be injected from each of the port injection valves 271-274, based on operating conditions of the engine 10. Further, the ECU 41 calculates an energization period of each of the port injection valves 271-274 corresponding to the required injection amount, and each of the port injection valves 271-274 is energized for the calculated energization period, in a predetermined order, at intervals of a predetermined crank angle. Thus, portion injection is carried out with the injection amount corresponding to the required injection amount. The fuel injection from the group of direct injection valves 37 is carried out in the same manner.

The valve-open period in which each of the fuel injection valves is open is proportional to the energization period in which current is applied to the electromagnetic coil of the fuel injection valve. Accordingly, the ECU 41 calculates the energization period of each of the port injection valves 271-274 corresponding to the required injection amount, based on a detection value of the fuel pressure sensor 28. Similarly, the ECU 41 calculates the energization period of each of the direct injection valves 371-374 corresponding to the required injection amount, based on a detection value of the fuel pressure sensor 38. The ECU 41 generates a command to the driver circuit 42, according to the calculated energization period. The driver circuit 42 energizes each of the port injection valves 271-274 and the direct injection valves 371-374 for the calculated energization period, according to the command from the ECU 41. In this manner, the fuel injection amount of each of the fuel injection valves is controlled.

Figure 2:
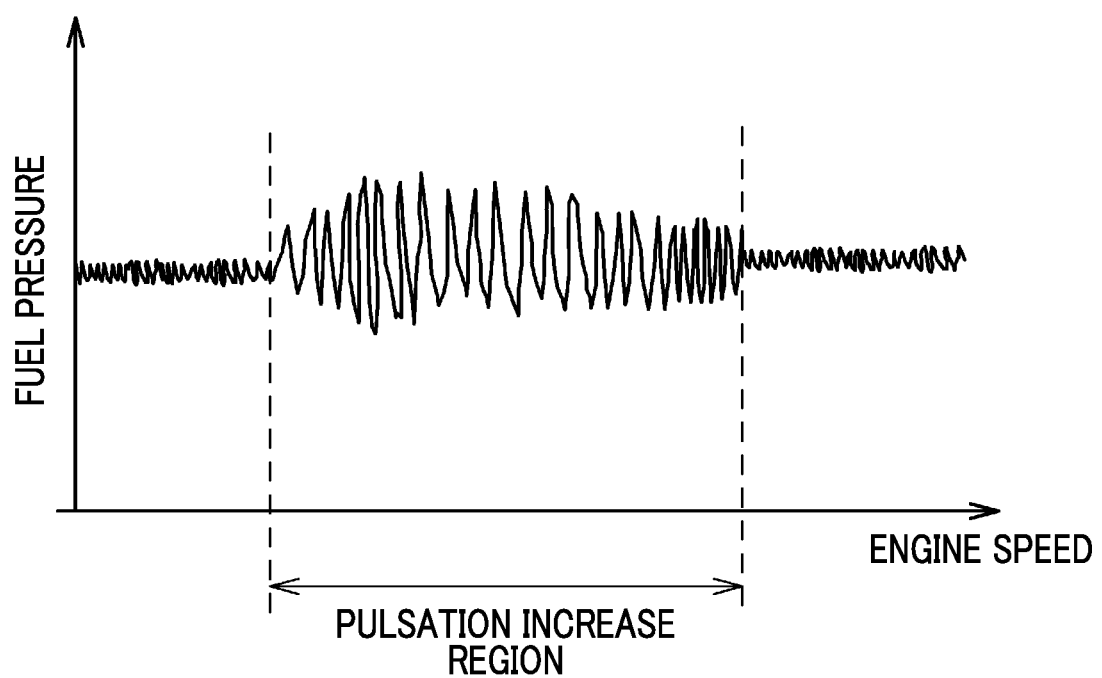
FIG. 2 is a waveform diagram of the fuel pressure.

Next, fuel pressure pulsation that occurs due to the high-pressure pump 31 will be described. FIG. 2 is a waveform diagram of the fuel pressure. In FIG. 2, the vertical axis indicates the fuel pressure, and the horizontal axis indicates the engine speed. As shown in FIG. 2, the engine speed range includes a pulsation increase region in which the amplitude of the fuel pressure pulsation in the low-pressure fuel pipe 25 and the low-pressure delivery pipe 26 increases to be larger than those in other regions. The pulsation increase region is a region in which the engine speed is in the range of 800-1400 rpm, for example; however, the pulsation increase region is not limited to this region.

The amplitude of the fuel pressure pulsation may be increased for the following reason. In a given region of the engine speed, fuel injection is carried out by the group of port injection valves 27, without using the group of direct injection valves 37. During the fuel injection, the solenoid valve 32 is kept in the open state since the direct injection valves 37 are not used, and the plunger 31p repeatedly moves up and down with the power of the engine 10. Therefore, the fuel is repeatedly drawn and discharged the low-pressure fuel pipe 25 and the pressurizing chamber 31a, whereby the amplitude of pulsation increases, and the pulsation is propagated to the low-pressure delivery pipe 26. Also, if the frequency of the fuel pressure pulsation as described above coincides with the natural frequency of the pulsation damper 29, resonance occurs, and the amplitude of the fuel pressure pulsation further increases.

Figure 3:
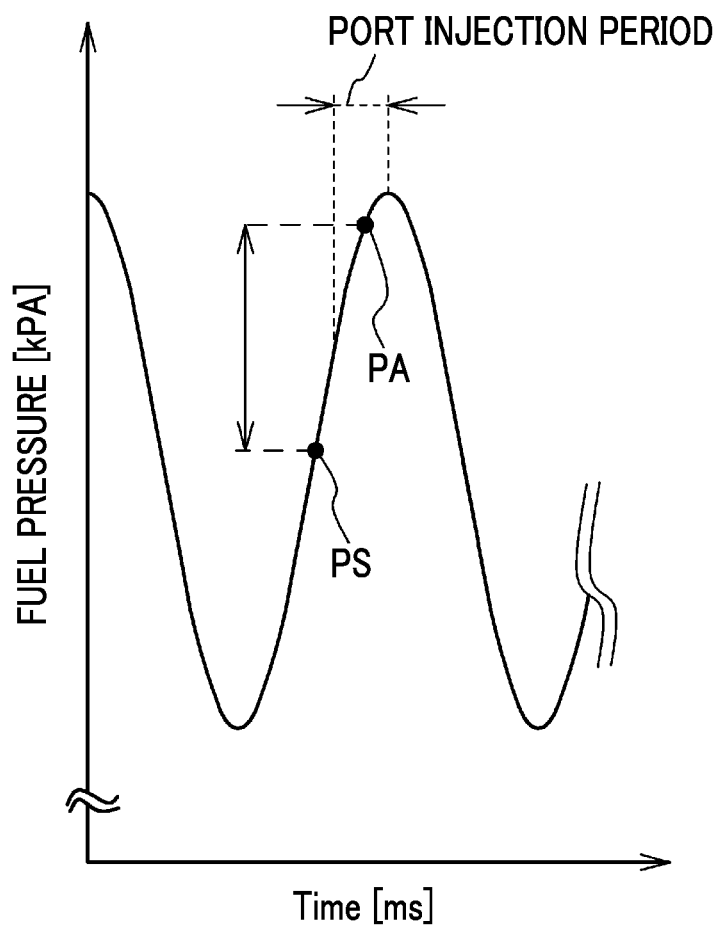
FIG. 3 is a graph showing one example of waveform of fuel pressure pulsation and a period of injection by a port injection valve.

FIG. 3 is a graph showing one example of the waveform of fuel pressure pulsation and an energization period of a port injection valve. In FIG. 3, the vertical axis indicates the fuel pressure, and the horizontal axis indicates time. FIG. 3 shows the waveform of pulsation in a condition where the engine speed belongs to the above-described pulsation increase region. Here, fuel pressure value PA is an actual fuel pressure value during energization, namely, during a port injection period, and detection value PS is a detection value of the fuel pressure sensor 28 obtained by the ECU 41. Generally, the energization period of port injection is calculated for control of the port injection amount, based on the detection value PS obtained before start of port injection. This is because the ECU 41 needs to complete calculation of the energization period based on the obtained detection value of the fuel pressure sensor 28, before reaching the start time of port injection. Also, the ECU 41 is only able to obtain detection values of the fuel pressure sensor 28 at fixed sampling time intervals. However, since the fuel pressure varies in a short time when the engine speed belongs to the above-described pulsation increase region, and also varies even during injection, a difference between the detection value PS and the fuel pressure value PA may be large, as shown in FIG. 3. Therefore, if the energization period is calculated based on the detection value PS, the port injection amount may not be controlled with high accuracy.

In this embodiment, the ECU 41 calculates a target energization period of a port injection valve, based on a calculation formula including a model formula that will be described later. Thus, the injection amount of each of the port injection valves 27 can be controlled with high accuracy, even in the case where fuel pressure pulsation occurs. Initially, the model formula will be described. In the following description, "detection value" means a detection value of the fuel pressure sensor 28, unless otherwise specified.

Figure 4A:
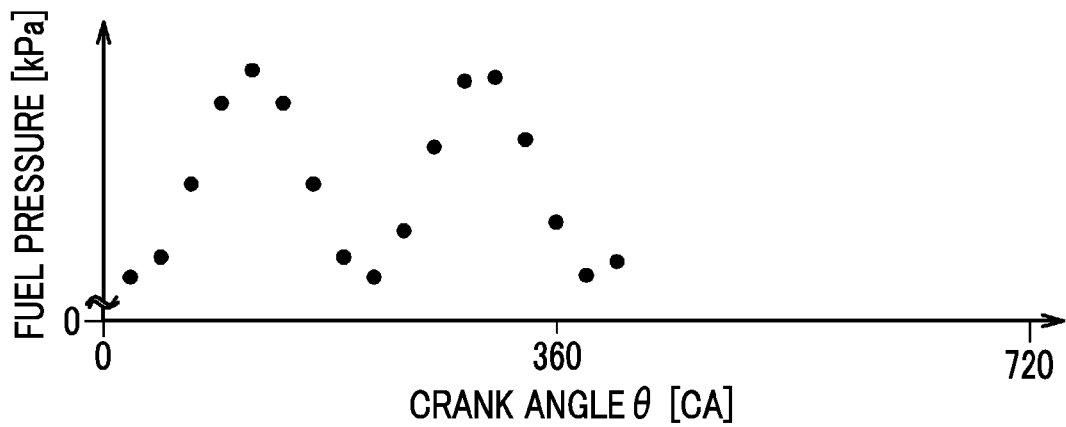
FIG. 4A is a graph indicating a plurality of detection values obtained by an ECU.
Figure 4B:
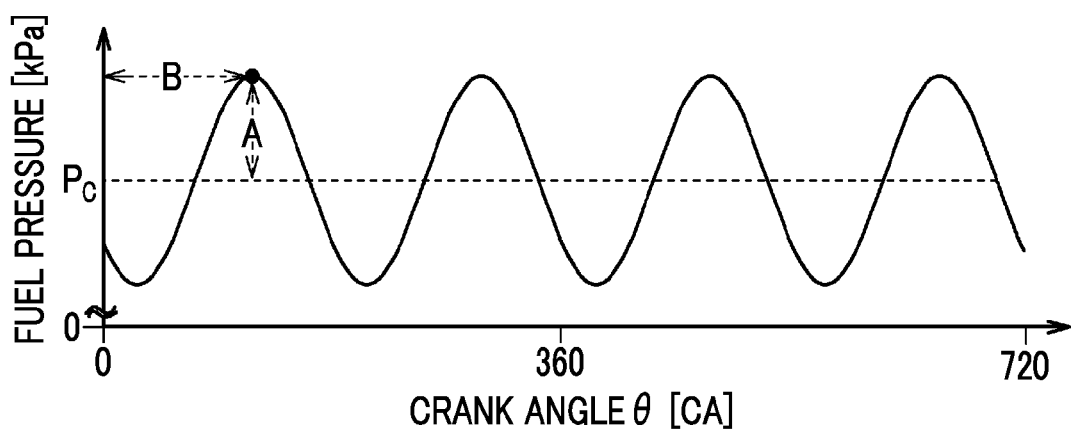
FIG. 4B is a graph indicating fuel pressure pulsation that is modeled based on the plurality of detection values.

As described above, the ECU 41 obtains detection values at fixed sampling time intervals. FIG. 4A is a graph indicating a plurality of detection values obtained by the ECU 41. FIG. 4B is a graph indicating modeled pulsation based on the plurality of detection values. In FIG. 4A and FIG. 4B, the vertical axis indicates the fuel pressure, and the horizontal axis indicates the crank angle. The model formula of pulsation is expressed as follows.

$$P(\theta)=A\cos\{c(\theta-B)\}+P_c \quad (3)$$

In this formula (3), θ [deg] is the crank angle, P(θ) [kPa] is a fuel pressure value corresponding to the crank angle θ, A [kPa] is the amplitude of pulsation, B [deg] is the initial phase of pulsation, and c is the number of times of discharge of the fuel from the high-pressure pump 31 per 360 degrees of crank angle, in other words, the frequency of pulsation per 360 degrees of crank angle. $P_c$ [kPa] is a center fuel pressure value of pulsation. The center fuel pressure value $P_c$ is a center value of the amplitude A. The initial phase B is the crank angle at the time when the crank angle θ is closest to zero degree, and the amplitude A assumes the maximum value. The crank angle θ is equal to zero degree, when the piston of the cylinder 111 is located at the top dead center of the compression stroke.

Thus, the fuel pressure pulsation can be modeled by the formula using a trigonometric function, because the fuel pressure periodically changes due to rotation of the cam CP of the high-pressure pump 31, as described above. The center fuel pressure value $P_c$, amplitude A, and the initial phase B are calculated by the ECU 41, based on detection values of the fuel pressure sensor 28, etc., as will be described in detail later.

The number of times of discharge c is stored in advance in the ROM of the ECU 41. The number of times of discharge c is determined by the shape of the cam CP of the high-pressure pump 31. In this embodiment, the shape of the cam CP is generally square with rounded corners. Therefore, the cam CP rotates 180 degrees and the fuel is discharged twice per 360 degrees of crank angle. Accordingly, in this embodiment, the number of times of discharge c is 2. The ROM of the ECU 41 is one example of the discharge frequency storage unit in which the number of times of discharge c of the fuel from the high-pressure pump 31 per 360 degrees of crank angle is stored. In the case where the cam is in the shape of a generally equilateral triangle with rounded corners, the cam rotates 180 degrees per 360 degrees of crank angle, and the number of times of discharge c is 1.5. In the case where the cam has a generally elliptical shape, the number of times of discharge c per 360 degrees of crank angle is 1.

Figure 5:
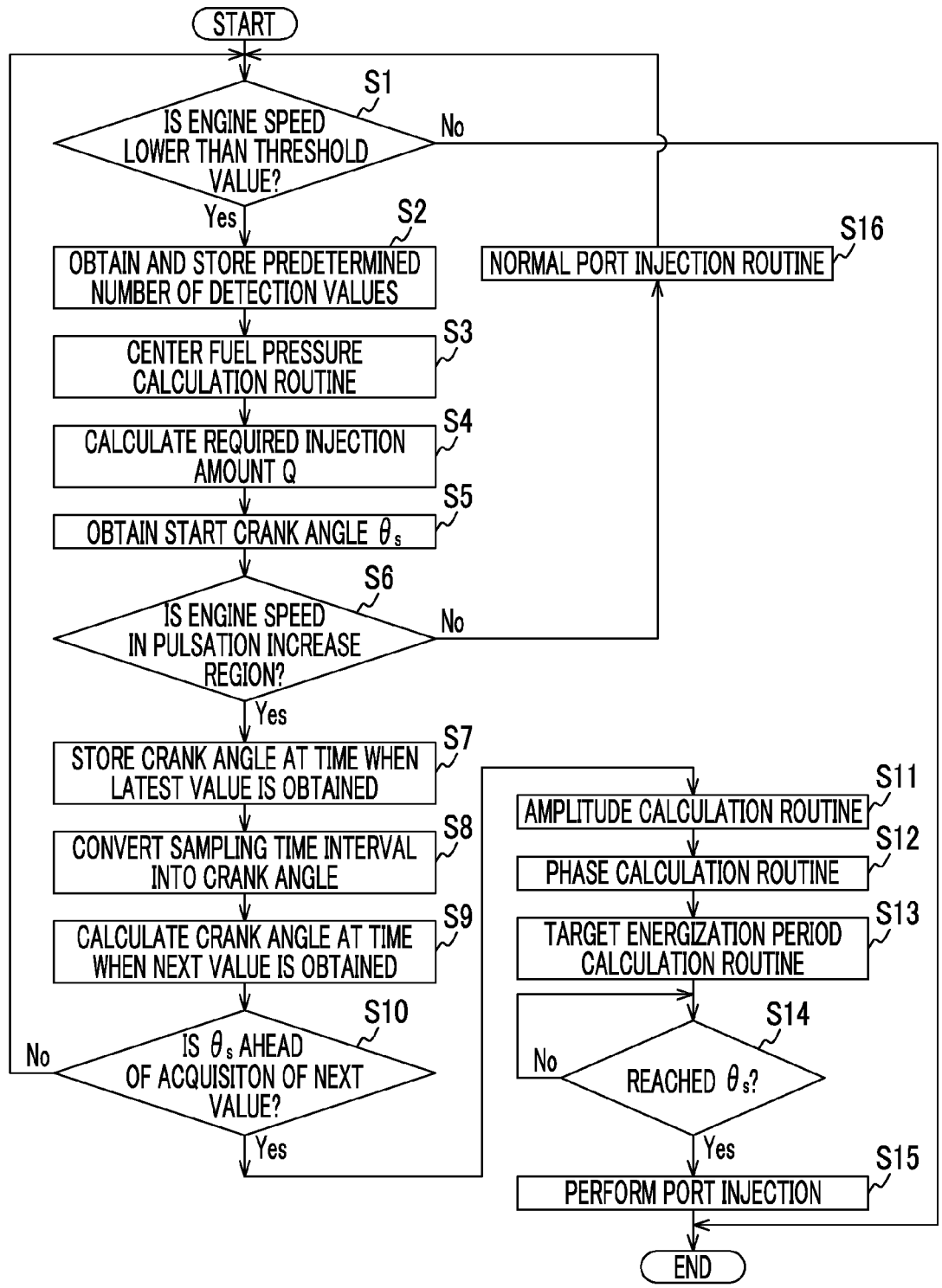
FIG. 5 is a flowchart illustrating one example of port injection control.

Next, port injection control will be described. FIG. 5 is a flowchart illustrating one example of port injection control. In the following description, "first latest fuel pressure value" means a detection value of the fuel pressure sensor 28 obtained by the ECU 41 most recently, and "second latest fuel pressure value" means a detection value of the fuel pressure sensor 28 obtained by the ECU 41 immediately before the first latest fuel pressure value is obtained, while "third latest fuel pressure value" means a detection value of the fuel pressure sensor 28 obtained by the ECU 41 immediately before the second latest fuel pressure value is obtained. Also, "next fuel pressure value" means a detection value of the fuel pressure sensor 28 which is expected to be obtained next time by the ECU 41.

The ECU 41 determines whether the engine speed [rpm] calculated based on the output of the crank angle sensor 14*a* is lower than a predetermined threshold value (step S1). The threshold value is defined as the upper limit of the engine speed at which port injection can be requested, and is set to a value that is larger than the engine speeds in the above-described pulsation increase region. If a negative decision (NO) is made in step S1, it is determined that no port injection is carried out, and this control routine ends.

If an affirmative decision (YES) is made in step S1, the ECU 41 obtains a predetermined number of detection values, and stores them in the RAM (step S2). If the predetermined number of detection values that have already been obtained are stored in the RAM, they are successively updated such that the oldest one of the stored detection values is replaced with a newly obtained detection value. The predetermined number, which will be described in detail later, is the number of detection values needed to calculate the center fuel pressure value $P_c$. Step S2 is also executed for the sake of calculation of the amplitude A and the initial phase B. The detection values obtained and stored in step S2 include at least the second latest fuel pressure value and the first latest fuel pressure value as two latest detection values. The operation of step S2 is one example of operation performed by the obtaining unit that obtains detection values of the fuel pressure sensor 28 at fixed sampling time intervals.

Then, the ECU 41 executes a center fuel pressure calculation routine for calculating the center fuel pressure value $P_c$ of pulsation based on at least the second latest fuel pressure value and the first latest fuel pressure value, which were stored in the RAM in step S2 (step S3). Accordingly, even when the engine speed does not belong to the above-described pulsation increase region, the center fuel pressure calculation routine is executed. This is because each term of the model formula (3) can be immediately calculated when the engine speed belongs to the pulsation increase region. The operation of step S3, and the operation of step S11 and S12 which will be described later, are one example of operation performed by the model calculating unit that calculates the center fuel pressure value $P_c$, amplitude A, and the initial phase B, based on at least the second latest fuel pressure value and the first latest fuel pressure value as detection values. The operation of step S3 will be described in detail later.

The required injection amount Q [mL] of the fuel required to be injected from each of the port injection valves 27 is calculated, based on operating conditions of the engine 10, more specifically, the engine speed, intake air amount, accelerator pedal position, and so forth (step S4). The operation of step S4 is one example of operation performed by the required injection amount calculating unit that calculates the required injection amount Q of the fuel required to be injected from each of the port injection valves 27, based on the conditions of the engine 10.

Then, the start crank angle $\theta_s$ at which injection of a port injection valve that is scheduled to inject fuel next time is scheduled to be started is obtained (step S5). The start crank angle $\theta_s$ is set according to operating conditions of the engine 10, and stored in the RAM. Also, the start crank angle $\theta_s$ differs among the port injection valves 271-274, namely, the port injection valves 271-274 start injecting fuel at different start crank angles $\theta_s$.

Then, the ECU 41 determines whether the engine speed belongs to the above-described pulsation increase region (step S6). The pulsation increase region is calculated in advance by experiment and stored in the ROM. The operation of step S6 is one example of operation performed by the pulsation determining unit that determines whether the engine speed calculated based on the output of the crank angle sensor 14*a* belongs to the pulsation increase region in which the amplitude of pulsation is larger than those in other rotational speed regions.

If a negative decision (NO) is made in step S6, it is determined that the fuel pressure does not vary largely, and the ECU 41 executes a normal port injection routine (step S16). In the normal port injection routine, the target energization period is calculated according to the following equation (4), without using the above-described model formula (3), and the port injection valve is energized only for the calculated target energization period, so that port injection is carried out.

$$\tau = \frac{Q}{k\sqrt{P}} \times 60 \times 1000 \tag{4}$$

In Eq. (4) above, Q [mL] is the required injection amount calculated in step S4, and P [kPa] is a detection value of the fuel pressure sensor 28 obtained immediately before start of injection of the port injection valve for which fuel injection is controlled. In the same equation, τ [ms] is the target energization period of the port injection valve, and k [mL·min$^{-1}$·kPa$^{-0.5}$], which is a constant, satisfies the following equation: k=$Q_{INJ}/\sqrt{P_0}$, where $Q_{INJ}$ [mL·min$^{-1}$] is the nominal flow rate of the port injection valve, and $P_0$ [kPa] is a test pressure corresponding to the nominal flow rate. The constant k is calculated in advance by experiment, and is stored in the ROM in association with each of the port injection valves 27. On the right side of Eq. (4), the first term is multiplied by 60 and 1000, so that the value of the first term on the right side of Eq. (4) is converted into milliseconds, which is the same unit as the target energization period τ.

When the amplitude of pulsation is relatively small, a difference between the detection value obtained immediately before start of injection and a fuel pressure value obtained during port injection is also small; therefore, the port injection amount can be appropriately controlled, without using the above-described model formula (3). After execution of the normal port injection routine, step S1 and subsequent steps are executed again.

If an affirmative decision (YES) is made in step S6, the ECU 41 stores the crank angle at the time when the first latest fuel pressure value was obtained in step S2, in the RAM, based on an output value of the crank angle sensor 14a (step S7). The crank angle at the time of acquisition of the first latest fuel pressure value is updated each time a new detection value is obtained. Then, the ECU 41 converts the sampling time interval stored in advance in the ROM, into the crank angle, based on the latest engine speed calculated (step S8). The engine speed is taken into consideration, because the sampling time interval is constant or fixed whereas the engine speed varies. Then, the ECU 41 adds the crank angle corresponding to the sampling time interval to the crank angle at the time of acquisition of the first latest fuel pressure value, to calculate the crank angle at the time when the next fuel pressure value is scheduled to be obtained (step S9).

Then, the ECU 41 determines, based on the crank angle at the time when the next fuel pressure value is scheduled to be obtained, whether the start crank angle $\theta_s$ obtained in step S5 is ahead of the crank angle at which the next fuel pressure value is scheduled to be obtained (step S10). Steps S7-S9 are required so as to perform the determining operation of step S10. The operation of steps S7-S10 is one example of operation performed by the injection start determining unit that determines whether the start crank angle $\theta_s$ is between the crank angle at the time when the latest detection value of the fuel pressure was obtained, and the crank angle at the time when the next detection value is scheduled to be obtained. If a negative decision (NO) is made in step S10, step S1 and subsequent steps are executed again, and the center fuel pressure calculating routine is continued.

If an affirmative decision (YES) is made in step S10, the ECU 41 performs an amplitude calculation routine for calculating the amplitude A of pulsation, based on at least the second latest fuel pressure value and the first latest fuel pressure value, which are stored in the RAM in step S2 (step S11). Then, the ECU 41 executes a phase calculation routine for calculating the initial phase B, based on at least one of the second latest fuel pressure value and the first latest fuel pressure value, which are stored in the RAM in step S2 (step S12). The amplitude calculation routine and the phase calculation routine will be described in detail later. In the manner as described above, each term of the model formula (3) is calculated, based on the operation of steps S3, S11 and S12.

Then, the ECU 41 performs a target energization period calculation routine for calculating the target energization period τ of the port injection valve, based on a calculation formula which will be described later (step S13). In step S13, the target energization period τ is calculated based on the calculation formula including the model formula (3), without using the above-described equation (4), as will be described in detail later.

Then, the ECU 41 determines whether the current crank angle has reached the start crank angle $\theta_s$, based on a detection value of the crank angle sensor 14a (step S14). If a negative decision (NO) is made in step S14, step S14 is executed again. If an affirmative decision (YES) is obtained in step S14, the ECU 41 performs port injection by energizing the port injection valve scheduled to inject fuel next time, for the target energization period τ calculated in step S13 (step S15). The operation of step S15 is one example of operation performed by the injection control unit that performs fuel injection by energizing the port injection valve for the target energization period τ. When the engine speed belongs to the pulsation increase region, the port injection control is performed in this manner.

Next, the above-described target energization period calculation routine will be described. In this control, a provisional injection amount $Q_p$ [mL] in the case where a port injection valve is assumed to inject fuel within any given crank angle range is calculated, based on the following calculation formula (5) including the model formula (3).

$$Q_p = \frac{k}{360 \cdot Ne} \int \sqrt{P(\theta)}\, d\theta \tag{5}$$

where Ne [rpm] is the engine speed. By multiplying the engine speed Ne indicating the number of revolutions per minute by 360, Ne [rpm] is converted into the angle of rotation (deg) of the crankshaft 14 per minute. In the above formula (5), k [mL·min$^{-1}$·kPa$^{-0.5}$] is the above-described constant, and P(θ) [kPa] is the above-described model formula (3).

The calculation formula (5) is derived in the following manner. It is understood from the above-described equation (4) that the injection amount per minute can be expressed as k√P. If the above-described model formula (3) and the engine speed Ne are used, the injection amount per unit crank angle can be expressed as {k/(360·Ne)}×√P(θ). Here, (360·Ne) means the angle of rotation [deg] of the crankshaft 14 per minute. Accordingly, the injection amount in any given crank angle range can be calculated by integrating the above expression indicating the injection amount per unit crank angle over the given crank angle range. The calculation formula (5) is stored in the ROM of the ECU 41.

Accordingly, the ROM of the ECU 41 is one example of the storage unit that stores Eq. (2) including Eq. (1) that models pulsation, which makes it possible to calculate the provisional injection amount for the case where the port injection valve is assumed to inject fuel in the given crank angle range.

To calculate the target energization period τ corresponding to the required injection amount Q of the fuel required to be injected from the port injection valve, it is only required to find the start crank angle $\theta_s$ and an end crank angle $\theta_e$ for the case where the provisional injection amount calculated according to the calculation formula (5) becomes equal to the required injection amount Q. Here, the end crank angle $\theta_e$ is the crank angle corresponding to the scheduled end time of fuel injection of the port injection valve. In this embodiment, since the start crank angle $\theta_s$ has been obtained in step S5, it is only necessary to calculate the end crank angle $\theta_e$. Accordingly, it is considered to calculate the end crank angle $\theta_e$ for the case where the following equation is satisfied.

$$Q = \frac{k}{360 \cdot Ne} \int_{\theta_s}^{\theta_e} \sqrt{A\cos\{c(\theta - B)\} + P_c}\, d\theta \qquad (6)$$

However, if the end crank angle $\theta_e$ is calculated based on the above equation (6), the calculation may be complicated, and the processing load of the ECU 41 may be increased. Accordingly, in this embodiment, the end crank angle $\theta_e$ is calculated in the manner as described below, and the target energization period τ is calculated.

Figure 6:
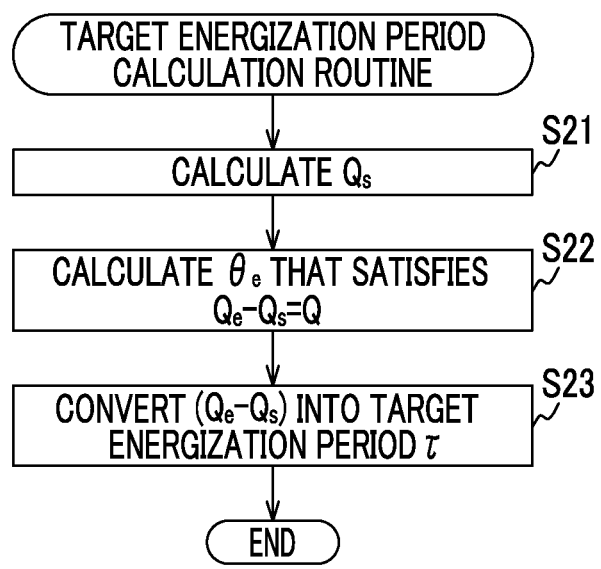
FIG. 6 is a flowchart illustrating one example of a target energization period calculation routine.

FIG. 6 is a flowchart illustrating one example of the target energization period calculating routine. The ECU 41 calculates a provisional injection amount $Q_s$ for the case where the port injection valve that is scheduled to inject fuel next time is assumed to inject fuel, in a crank angle range from a base crank angle $\theta_B$ to the start crank angle $\theta_s$ obtained in step S5, based on the above-described calculation formula (5) (step S21). The provisional injection amount $Q_s$ can be expressed by the following integral equation.

$$Q_s = \frac{k}{360 \cdot Ne} \int_{\theta_B}^{\theta_s} \sqrt{A\cos\{c(\theta - B)\} + P_c}\, d\theta \qquad (7)$$

Here, the base crank angle $\theta_B$ is a crank angle corresponding to the initial phase B, and $(\theta_B - B)$ is equal to 0. Therefore, an integral value of the trigonometric function in Eq. (7) can be easily calculated, and the processing load on the ECU 41 is less likely or unlikely to be increased due to calculation of the provisional injection amount $Q_s$.

Then, the ECU 41 calculates the end crank angle $\theta_e$ for the case where a value obtained by subtracting the provisional injection amount $Q_s$ from a provisional injection amount $Q_e$ from the base crank angle $\theta_B$ to the end crank angle $\theta_e$ becomes equal to the required injection amount Q calculated in step S4 (step S22). Namely, the end crank angle $\theta_e$ is calculated for the case where the following equation is satisfied.

$$Q_e - Q_s = Q \qquad (8)$$

Here, the provisional injection amount $Q_e$ can be expressed by the following integral equation.

$$Q_e = \frac{k}{360 \cdot Ne} \int_{\theta_B}^{\theta_e} \sqrt{A\cos\{c(\theta - B)\} + P_c}\, d\theta \qquad (9)$$

As described above, since $(\theta_B - B) = 0$, the integral value of the trigonometric function of Eq. (9) can be easily calculated, and the processing load on the ECU 41 is less likely or unlikely to be increased due to calculation of the end crank angle $\theta_e$. Steps S21 and S22 are one example of operation performed by the calculating unit that calculates the other of the start crank angle $\theta_s$ and the end crank angle $\theta_e$, based on one of the start crank angle $\theta_s$ and the end crank angle $\theta_e$ obtained and Eq. (2), for the case where the value obtained by subtracting the provisional injection amount $Q_s$ from the base crank angle $\theta_B$ to the start crank angle $\theta_s$, from the provisional injection amount $Q_e$ from the base crank angle $\theta_B$ corresponding to the initial phase B of pulsation, to the end crank angle $\theta_e$, is regarded as being equal to the required injection amount Q.

Figure 7A:
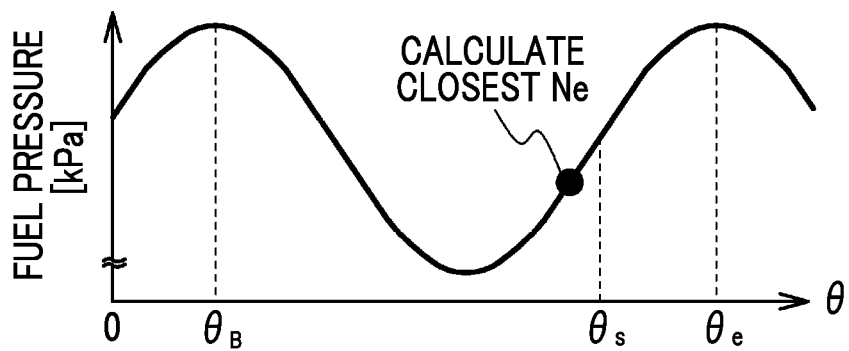
FIG. 7A is a graph indicating the relationship between the crank angle and the fuel pressure.
Figure 7B:
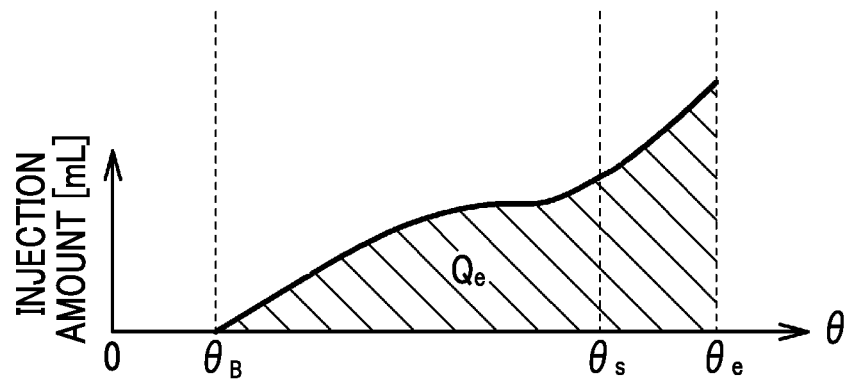
FIG. 7B is a graph indicating the relationship between the crank angle and a provisional injection amount.
Figure 7C:
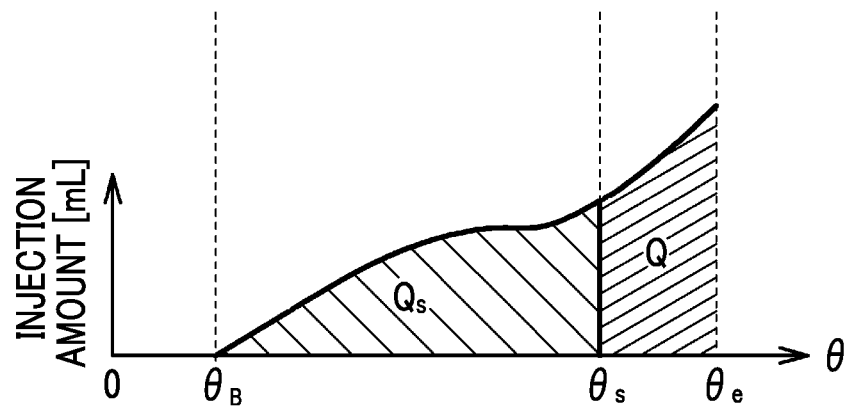
FIG. 7C is a graph indicating the relationship between the crank angle, required injection amount, and a provisional injection amount.

FIG. 7A-FIG. 7C are graphs indicating the crank angle, fuel pressure, required injection amount Q, and the provisional injection amounts $Q_s$ and $Q_e$. The graphs of FIG. 7A-FIG. 7C make it easy to understand the relationships among these parameters. The horizontal axes of FIG. 7A-FIG. 7C indicate the crank angle, and the vertical axis of FIG. 7A indicates the fuel pressure, while the vertical axes of FIG. 7B and FIG. 7C indicate the injection amount [mL]. In FIG. 7B, the provisional injection amount $Q_e$ is indicated by area. In FIG. 7C, the provisional injection amount $Q_s$ and the required injection amount Q are indicated by respective areas. Each of the injection amounts indicated in FIG. 7B and FIG. 7C represents the total injection amount obtained by integrating the injection amount per unit crank angle over a corresponding one of the crank angle ranges. As shown in FIG. 7B and FIG. 7C, the end crank angle $\theta_e$ at which the above equation (7) is satisfied is the end crank angle of the case where the port injection valve injects the required injection amount Q. FIG. 7A shows the time of calculation of the engine speed Ne closest to the start crank angle $\theta_s$, which speed is used for calculation of the provisional injection amounts $Q_s$ and $Q_e$.

Then, the ECU 41 converts the crank angle range from the calculated end crank angle $\theta_e$ to the start crank angle $\theta_s$, into the target energization period τ [ms] (step S23). More specifically, the target energization period τ is calculated based on the following equation.

$$\tau = (\theta_e - \theta_s) \times \frac{60 \times 1000}{360 \cdot Ne} \qquad (10)$$

As described above, the engine speed Ne [rpm] is multiplied by 360, so that the engine speed can be converted into the rotational angle [deg] of the crankshaft 14. Also, the engine speed Ne [rpm] is divided by 60 and further divided by 1000, so that the engine speed per minute can be converted into the engine speed per millisecond. In this manner, the target energization period τ [ms] corresponding to the crank angle range from the start crank angle $\theta_s$ to the end crank angle $\theta_e$ can be calculated. Generally, port injection starts and ends during the intake stroke of each cylinder; therefore, the crank angle range from the start crank angle $\theta_s$ to the end crank angle $\theta_e$ does not include the top dead center at which the crank angle is zero degree. Therefore, the above-indicated $(\theta_e - \theta_s)$ assumes a positive value [deg]. The operation of step S23 is one example of operation performed by the target energization period converting unit that converts the crank angle range from the start crank angle $\theta_s$ to the end crank angle $\theta_e$, into the target energization period $\tau$.

Thus, the target energization period $\tau$ corresponding to the required injection amount Q is calculated, based on the calculation formula (5) including the model formula (3) that takes account of pulsation of the fuel pressure. Therefore, even when the engine speed belongs to the pulsation increase region, the target energization period $\tau$ can be calculated with high accuracy, whereby the port injection amount can be controlled with high accuracy. Accordingly, the air-fuel ratio can be controlled with high accuracy.

Also, since the end crank angle $\theta_e$ is calculated based on the two provisional injection amounts $Q_s$ and $Q_e$ that can be expressed using the base crank angle $\theta_B$, the processing load of the ECU 41 is less likely or unlikely to be increased.

As described above, only when affirmative decisions (YES) are made in step S6 and step S10, each term of the model formula (3) is calculated, and the target energization period is calculated based on the calculation formula (5). Therefore, the target energization period is calculated based on the calculation formula (5) only when necessary, and the processing load of the ECU 41 is less likely or unlikely to be increased.

Even when the engine speed does not belong to the above-described pulsation increase region, the target energization period may be calculated based on the above-indicated calculation formula (5), and port injection may be carried out. For example, since the low-pressure pump 22 is subjected to feedback control, the fuel pressure may slightly pulsate due to the low-pressure pump 22 even when the engine speed is not included in the pulsation increase region.

In the above-described embodiment, the start crank angle $\theta_s$ is set in step S5 according to operating conditions of the engine 10. However, the manner of obtaining the start crank angle $\theta_s$ is not limited to this. For example, a provisional end crank angle may be set according to operating conditions of the engine 10, and a provisional target energization period may be calculated based on detection values of the fuel pressure sensor 28. Then, a crank angle that is ahead of the provisional end crank angle by a degree corresponding to the provisional target energization period may be obtained as the start crank angle $\theta_s$.

While the end crank angle $\theta_e$ is calculated in step S22 after the start crank angle $\theta_s$ is obtained in step S5 in the above-described embodiment, the present disclosure is not limited to this. For example, in the case where the end crank angle $\theta_e$ is obtained first according to engine conditions, the provisional injection amount $Q_e$ may be calculated based on the end crank angle $\theta_e$ thus obtained first, and then the start crank angle $\theta_s$ may be calculated for the case where the above-described equation (8) is satisfied, based on the required injection amount Q and the provisional injection amount $Q_e$. In this case, it is necessary to calculate the start crank angle $\theta_s$ and complete calculation of the target energization period $\tau$, before the current crank angle reaches a crank angle that is ahead of the end crank angle $\theta_e$ by a crank angle range corresponding to the maximum value of the energization period that can be calculated. Accordingly, step S10 is executed, regarding the crank angle that is ahead of the end crank angle $\theta_e$ by the crank angle range corresponding to the maximum value of the energization period, as a provisional start angle. When an affirmative decision (YES) is obtained in step S10, the actual start crank angle $\theta_s$ may be calculated and the target energization period $\tau$ may be calculated by the above-described method.

Next, the center fuel pressure calculation routine will be described. The ECU 41 calculates the center fuel pressure value $P_c$, based on the third latest fuel pressure value, the second latest fuel pressure value, and the first latest fuel pressure value, which were obtained in step S2, and the crank angle corresponding to the sampling time interval. Where "t [deg]" denotes the crank angle corresponding to the sampling time interval, and "a" denotes a coefficient, the third latest fuel pressure value $P_1$ [kPa], second latest fuel pressure value $P_2$ [kPa], and the first latest fuel pressure value $P_3$ [kPa] are respectively expressed by the following equations: $P_1$=A sin(a)+$P_c$, $P_2$=A sin(a+t)+$P_c$, $P_3$=A sin(a+2t)+$P_c$. From these three equations, the coefficient "a" is expressed by use of the third latest fuel pressure value $P_1$, second latest fuel pressure value $P_2$, first latest fuel pressure value $P_3$, and the crank angle t, and the calculated coefficient "a" is substituted into any of the above three equations, so that the center fuel pressure value $P_c$ can be calculated. The crank angle t corresponding to the sampling time interval is calculated according to the above-described method of step S8.

Also, a smoothed value of detection values may be calculated as the center fuel pressure value $P_c$. The smoothed value is calculated based on the first latest fuel pressure value, smoothed value calculated last time, and a smoothing coefficient. The smoothed value calculated last time is calculated based on the second latest fuel pressure value. Therefore, the smoothed value calculated this time is calculated based on the first latest fuel pressure value and the second latest fuel pressure value. If the smoothed value is calculated this time for the first time, and there is no smoothed value calculated last time, the second latest fuel pressure value is used as the smoothed value calculated last time. Accordingly, when the smoothed value of detection values is calculated as the center fuel pressure value $P_c$, the predetermined number in step S2 may be two or more.

FIG. 7 is a flowchart illustrating the second example of center fuel pressure calculation Also, the average value of the obtained detection values may be calculated as the center fuel pressure value $P_c$. For example, the number of samples of detection values used for calculation may be set, based on a map in which the number of samples decreases as the engine speed increases, so as to correspond to the number of detection values obtained in a period of a generally one cycle of pulsation. In this case, the predetermined number in step S2 is at least two, i.e., two or more.

Next, the amplitude calculation routine will be described. Where $\theta_n$ and $\theta_{n-1}$ denote respective crank angles at the time when the first latest fuel pressure value $P_n$ and the second latest fuel pressure value $P_{n-1}$ were obtained, the first latest fuel pressure value $P_n$ and the second latest fuel pressure value $P_{n-1}$ can be expressed by the following equations, respectively.

$$P_n = A \cos\{c(\theta_n - B)\} \tag{11}$$

$$P_{n-1} = A \cos\{c(\theta_{n-1} - B)\} \tag{12}$$

The above equations (12) and (13) do not include the center fuel pressure value $P_c$, because there is no influence on calculation results of the amplitude A and the initial phase B even if the center fuel pressure value $P_c$ is regarded as zero.

Here, crank angle $\theta_{AD}$ [deg] corresponding to the sampling time interval can be expressed as $\theta_{AD}=\theta_n-\theta_{n-1}$. Accordingly, the amplitude A can be expressed as follows, based on Eq. (11) and Eq. (12).

$$A = \sqrt{\frac{(P_{n-1} \cdot \cos\theta_{AD} - P_n)^2}{\sin^2\theta_{AD}} + P_{n-1}^2} \quad (13)$$

Thus, the amplitude A can be calculated without using the center fuel pressure value $P_c$; therefore, the processing load of the ECU 41 is less likely or unlikely to be increased. Accordingly, the ECU calculates the amplitude A, based on the first latest fuel pressure value $P_n$ and the second latest fuel pressure value $P_{n-1}$, and the crank angle $\theta_{AD}$ corresponding to the sampling time interval.

Next, the phase calculation routine will be described. The ECU 41 calculates two candidates, i.e., candidate $B^+$ and candidate $B^-$, of the initial phase B, based on the following equation (14) calculated based on Eq. (13) and Eq. (11).

$$B = \theta_n \pm \left\{\cos^{-1}\left(\frac{P_n}{A}\right) \cdot \frac{1}{c}\right\} \quad (14)$$

Here, $B^+$ is defined as $B^+=\theta_n+\{\cos^{-1}(P_n/A)\times(1/c)\}$, and $B^-$ is defined as $B^-=\theta_n-\{\cos^{-1}(P_n/A)\times(1/c)\}$. In Eq. (14), the crank angle $\theta_{n-1}$ and the second latest fuel pressure value $P_{n-1}$ may be used, in place of the crank angle $\theta_n$ and the first latest fuel pressure value $P_n$. In this case, too, the initial phase B theoretically has the same value.

Here, a true solution of the initial phase B is determined based on the following expression (15).

$$|P_{n-1}-\{A\cos\{c(\theta_{n-1}-B)\}+P_c\}|<\epsilon \quad (15)$$

"$A\cos\{c(\theta_{n-1}-B^+)\}+P_c$" on the left side of the above expression (15) means a provisional fuel pressure value calculated based on the above-indicated candidate $B^+$. A predetermined value $\epsilon$ [kPa] is slightly larger than the maximum error that can be generated between the provisional fuel pressure value and the second latest fuel pressure value $P_{n-1}$, in the case where the true solution of the initial phase B is the candidate $B^+$. The predetermined value $\epsilon$ [kPa] is calculated in advance by experiment, and stored in the ROM. When the above expression (15) is satisfied, the ECU 41 specifies the candidate $B^+$ as the initial phase B. If the expression (15) is not satisfied, the ECU 41 specifies the candidate $B^-$ as the initial phase B. As described above, the initial phase B can be finally calculated based on the simple inequality expression (15); therefore, the processing load of the ECU 41 is less likely or unlikely to be increased.

In the above-indicated expression (15), the inequity sign may be reversed. In this case, the candidate $B^-$ is specified as the initial phase B when the expression (15) is satisfied, and the candidate $B^+$ is specified as the initial phase B when it is not satisfied. Also, in the expression (15), the candidate $B^-$ may be used in place of the candidate $B^+$. In this case, too, the candidate $B^-$ is specified as the initial phase B when the expression (15) is satisfied, and the candidate $B^+$ is specified as the initial phase B when it is not satisfied. Also, in the expression (15), the first latest fuel pressure value $P_n$ and the crank angle $\theta_n$ may be used, in place of the second latest fuel pressure value $P_{n-1}$ and the crank angle $\theta_{n-1}$. Accordingly, the ECU 41 calculates the initial phase B, based on one of the second latest fuel pressure value $P_{n-1}$ and the first latest fuel pressure value $P_n$, a crank angle at the time when the one of these fuel pressure values was obtained, the number of times of discharge c, calculated amplitude A, and the calculated center fuel pressure value $P_c$.

While one embodiment of the present disclosure has been described above in detail, the present disclosure is not limited to the particular embodiment, but may be subjected to various modifications and changes, within the scope of the principle of the present disclosure described in the appended claims.

What is claimed is:

1. A control system of an internal combustion engine, comprising:
   a direct injection valve configured to directly inject a fuel into a cylinder of the internal combustion engine;
   a port injection valve configured to inject the fuel into an intake port of the internal combustion engine;
   a low-pressure pump configured to pressurize the fuel;
   a low-pressure fuel supply passage through which the fuel pressurized by the low-pressure pump is supplied to the port injection valve;
   a high-pressure pump operatively linked with the internal combustion engine and configured to be driven by the internal combustion engine, the high-pressure pump being configured to further pressurize the fuel supplied from the low-pressure fuel supply passage, such that pulsation of a fuel pressure is generated in the low-pressure fuel supply passage;
   a high-pressure fuel supply passage through which the fuel pressurized by the high-pressure pump is supplied to the direct injection valve;
   a crank angle sensor configured to detect a crank angle of the internal combustion engine; and
   an electronic control unit configured to:
   (i) calculate a required injection amount of the fuel required to be injected from the port injection valve, based on conditions of the internal combustion engine;
   (ii) obtain one of a start crank angle and an end crank angle, the start crank angle being a crank angle corresponding to a scheduled start time of fuel injection of the port injection valve, the end crank angle being a crank angle corresponding to a scheduled end time of fuel injection of the port injection valve;
   (iii) calculate the other of the start crank angle and the end crank angle, based on an equation of $Q_p$ below for calculating a provisional injection amount of a case where the port injection valve provisionally injects the fuel with the one of the start crank angle and the end crank angle and a given crank angle range, such that a value obtained by subtracting a provisional injection amount from a base crank angle corresponding to an initial phase of the pulsation to the start crank angle, from a provisional injection amount from the base crank angle to the end crank angle becomes equal to the required injection amount, $$Q_p = \frac{k}{360 \cdot Ne} \int \sqrt{P(\theta)}\, d\theta$$

where, $Q_p$ is the provisional injection amount, k is a constant, and Ne is a rotational speed of the internal combustion engine, $\theta$ is the crank angle, P is a fuel pressure value corresponding to the crank angle, P is calculated by equation below, $$P(\theta) = A\cos\{c(\theta-B)\}+P_c$$

where, A is an amplitude of the pulsation, c is the number of times of discharge of the fuel from the high-pressure pump per 360 degrees of the crank angle, B is the initial phase of the pulsation, $P_c$ is a center fuel pressure value of the pulsation;

(iv) convert a crank angle range from the start crank angle to the end crank angle, into a target energization period; and (v) perform fuel injection by energizing the port injection valve for the target energization period.

2. The control system of the internal combustion engine according to claim 1, further comprising:

a fuel pressure sensor configured to detect the fuel pressure in the low-pressure fuel supply passage, wherein the electronic control unit is configured to:

(vi) obtain a detection value of the fuel pressure sensor at fixed sampling time intervals;

(vii) determine whether the start crank angle is between a first crank angle at a point in time at which the detection value of the fuel pressure sensor as a first latest fuel pressure value is obtained, and a second crank angle at a point in time at which the detection value is scheduled to be obtained next time, the first latest fuel pressure value being obtained most recently; and (viii) calculate the other of the start crank angle and the end crank angle, when the electronic control unit determines that the start crank angle is between the first crank angle and the second crank angle.

3. The control system of the internal combustion engine according to claim 1, further comprising:

a fuel pressure sensor configured to detect the fuel pressure in the low-pressure fuel supply passage, wherein:

the electronic control unit includes a memory that stores a number of times of discharge of the fuel from the high-pressure pump per 360 degrees of the crank angle; and the electronic control unit is configured to:

(ix) obtain a detection value of the fuel pressure sensor at fixed sampling time intervals; and (x) calculate a center fuel pressure value of the pulsation, an amplitude of the pulsation, and an initial phase of the pulsation, based on at least a first latest fuel pressure value, a second latest fuel pressure value, and a third latest fuel pressure value as detection values of the fuel pressure sensor, the first latest fuel pressure value being obtained most recently, the second latest fuel pressure value being obtained immediately before the first latest fuel pressure value is obtained, the third latest fuel pressure value being obtained immediately before the second latest fuel pressure value.

4. The control system of the internal combustion engine according to claim 3, wherein the electronic control unit is configured to calculate the amplitude of the pulsation, based on the second latest fuel pressure value and the first latest fuel pressure value as the detection values of the fuel pressure sensor, and the crank angle corresponding to the sampling time interval.

5. The control system of the internal combustion engine according to claim 4, wherein the electronic control unit is configured to calculate the initial phase of the pulsation, based on one of the second latest fuel pressure value and the first latest fuel pressure value as the detection values of the fuel pressure sensor, the crank angle at a time when the one of the second latest fuel pressure value and the first latest fuel pressure value is obtained, the number of times of discharge from the high-pressure pump per 360 degrees of the crank angle, the calculated amplitude of the pulsation, and the calculated center fuel pressure value of the pulsation.

6. The control system of the internal combustion engine according to claim 1, wherein the electronic control unit is configured to:

(xi) determine whether a rotational speed of the internal combustion engine belongs to a pulsation increase region in which the pulsation increases as compared with other rotational speed regions of the internal combustion engine; and (xii) calculate the other of the start crank angle and the end crank angle, when the rotational speed of the internal combustion engine belongs to the pulsation increase region.

* * * * *